:::: {.columns}
::: {.column}
(12) United States Patent
Taibi Guguen et al.

(54) CLIENT AND A METHOD FOR MANAGING, AT THE CLIENT, A STREAMING SESSION OF A MULTIMEDIA CONTENT

(71) Applicant: InterDigital Madison Patent Holdings, SAS, Paris (FR)

(72) Inventors: Charline Taibi Guguen, Cesson-Sevigne (FR); Yvon Legallais, Rennes (FR); Remi Houdaille, Cesson-Sevigne (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 17/424,364

(22) PCT Filed: Jan. 17, 2020

(86) PCT No.: PCT/EP2020/051112
§ 371 (c)(1),
(2) Date: Jul. 20, 2021

(87) PCT Pub. No.: WO2020/152045
PCT Pub. Date: Jul. 30, 2020

(65) Prior Publication Data
US 2022/0103899 A1 Mar. 31, 2022

(30) Foreign Application Priority Data
Jan. 22, 2019 (EP) .................................... 19305080

(51) Int. Cl.
*H04N 7/173* (2011.01)
*H04N 21/442* (2011.01)
(Continued)
:::

::: {.column}
(10) Patent No.: US 11,871,079 B2
(45) Date of Patent: Jan. 9, 2024

(52) U.S. Cl.
CPC ..... *H04N 21/44209* (2013.01); *H04N 21/816* (2013.01); *H04N 21/8456* (2013.01)

(58) Field of Classification Search
CPC ........... H04N 21/44209; H04N 21/816; H04N 21/8456; H04N 21/26258; H04N 21/44004; H04N 21/6547; H04N 21/23439
See application file for complete search history.

(56) References Cited

U.S. PATENT DOCUMENTS 8,527,649 B2    9/2013  Wexler et al.
8,649,426 B2    2/2014  White et al.
(Continued)

FOREIGN PATENT DOCUMENTS

CN     105208390 A    12/2015
CN     105308978 A    2/2016
(Continued)

OTHER PUBLICATIONS

English Translation for CN105208390, entitled "Video coding rate control method and system".
(Continued)

*Primary Examiner* — Gigi L Dubasky
(74) *Attorney, Agent, or Firm* — CONDO ROCCIA KOPTIW LLP

(57) ABSTRACT

A client (100) is able to manage a multimedia content in such a way that the buffering can be reduced as much as desired down to zero by selecting a representation for a next segment to be requested for which the first frame can be received at least in the frame duration.

16 Claims, 4 Drawing Sheets
:::
::::

(51) Int. Cl.
*H04N 21/81* (2011.01)
*H04N 21/845* (2011.01)

(56) References Cited

U.S. PATENT DOCUMENTS

| | | | |
|---|---|---|---|
| 8,891,619 B2 | 11/2014 | Leontaris et al. | |
| 10,708,667 B1* | 7/2020 | Waggoner | H04L 65/80 |
| 2010/0262712 A1* | 10/2010 | Kim | H04N 21/25825 |
| | | | 709/231 |
| 2013/0282918 A1* | 10/2013 | De Vleeschauwer | H04L 65/60 |
| | | | 709/231 |
| 2014/0173055 A1* | 6/2014 | Yu | H04L 65/80 |
| | | | 709/219 |
| 2014/0195651 A1 | 7/2014 | Stockhammer et al. | |
| 2014/0337904 A1* | 11/2014 | Panje | H04N 21/26258 |
| | | | 725/90 |
| 2014/0359679 A1 | 12/2014 | Shivadas et al. | |
| 2016/0119657 A1 | 4/2016 | Sun | |
| 2017/0094301 A1 | 3/2017 | Gu | |
| 2017/0104801 A1 | 4/2017 | Ver Steeg et al. | |
| 2017/0142431 A1* | 5/2017 | Wu | H04N 19/426 |
| 2018/0176613 A1 | 6/2018 | Gouache et al. | |

FOREIGN PATENT DOCUMENTS

| | | |
|---|---|---|
| CN | 106105145 A | 11/2016 |
| CN | 108600784 A | 9/2018 |
| EP | 2472866 A1 | 7/2012 |
| WO | 2014/081529 A1 | 5/2014 |
| WO | 2014/081530 A1 | 5/2014 |

OTHER PUBLICATIONS

Kupka et al., "An Evaluation of Live Adaptive HTTP Segment Streaming Request Strategies", 36th Annual IEEE Conference on Local Computer Networks, Bonn, Germany, Oct. 4, 2011, pp. 604-612.

Van Der Auwera et al., "Traffic and Quality Characterization of Single-Layer Video Streams Encoded with the H.264/MPEG-4 Advanced Video Coding Standard and Scalable Video Coding Extension", IEEE Transactions on Broadcasting, vol. 54, No. 3, Sep. 2008, pp. 698-718.

* cited by examiner

CLIENT AND A METHOD FOR MANAGING, AT THE CLIENT, A STREAMING SESSION OF A MULTIMEDIA CONTENT

CROSS REFERENCE TO RELATED APPLICATIONS

This application is the national stage entry under 35 U.S.C. § 371 of International Application PCT/EP2020/051112, filed Jan. 17, 2020, which was published in accordance with PCT Article 21(2) on Jul. 30, 2020, in English, and which claims the benefit of European Patent Application No. 19305080.4, filed Jan. 22, 2019.

TECHNICAL FIELD

The present disclosure relates to the streaming of multimedia content (such as panoramic videos, and 3DoF (Degree of Freedom), 3DoF+, 6DoF videos) to an end device through a delivery network.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

For example, spherical video (so called 3DoF video) content captures a scene with a 360° angle horizontally (and 180° vertically) allowing the user to navigate (i.e. pan) within the spherical scene for which the capture point is moving along the camera motion decided by an operator/scenarist. A spherical content is obtained through a multi-head camera, the scene being composed through stitching the camera's views, projecting them onto a sphere, mapping the sphere content onto a plan (for instance through an equirectangular projection) and compressing it through conventional video encoders.

Spherical videos offer an immersive experience wherein a user can look around using an adapted end-device (such as a head-mounted display (HMD)) or can navigate freely within a scene on a flat display by controlling the viewport with a controlling apparatus (such as a mouse, a remote control or a touch screen).

Such a freedom in spatial navigation requires that the whole spherical scene is delivered to a player (embedded within the HMD or TV set) configured to extract the video portion to be visualized depending on the position of the viewport within the scene. Therefore, a high bandwidth is necessary to deliver the whole spherical video.

The majority of known solutions streaming spherical videos provides the full spherical scene to the end device, but only less than 10% of the whole scene is presented to the user. Since delivery networks have limited bandwidth, the video quality is decreased to meet bandwidth constraints.

Other known solutions mitigate the degradation of the video quality by reducing the quality of the portion of the spherical scene arranged outside of the current viewport of the end device. Nevertheless, when such viewport is moved upon user's action to a low quality area, the displayed video suffers from a sudden degradation. In such solutions, the high quality is provided only for an area visible to the end user through a viewport, at a given time.

When HTTP Adaptive streaming is used for transporting the spherical video (e.g. MPEG-DASH), for all the available representations (e.g. video quality), the spherical video is temporally divided into a plurality of video segments which are spatially split in tiles (each tile covering a portion of the scene of the spherical video). Each video segment is then defined by a set of tile segments of the same duration to cover the whole spherical scene (each tile segment being available at said different video qualities). Each segment can be decoded independently from the previous segment of any representation, which allows the player to switch representation by selecting the segment to load at each segment boundary. While not absolutely necessary, those segments are most often built having all the same duration, starting with a Random Access Point (i.e. a frame that can be decoded without the need for any other reference image).

Thus, changes of representation can occur only at specific times. In the case of a common duration D for all segments, the switching occurs only at times which are a multiple of the duration D. The duration D of a segment has an impact on the video quality as it inherently bounds a group of pictures (GOP) all linked together for providing enhanced compression. For a constrained bit rate, bigger is the group of pictures, better is the compression and thus better is the quality. To have as many video representation switching opportunities as possible, D needs to be chosen as small as possible. The choice of D is then a compromise between the contradicting needs for the encoding quality and the switching delay.

However, the actual delay is worse than considering D only, since HTTP Adaptive Streaming requires a buffering of segments. Players have both to be robust to variations of networking conditions and to maximize the quality achievable with the current network bandwidth. To maximize the quality (when network conditions are stable), a player can select segments in a representation with an advertised bit-rate just slightly lower than the available bandwidth. In that case, required time to load one segment is slightly lower than the playing duration D of the segment.

When the network bandwidth is suddenly divided by N (i.e. the bandwidth drops down to 1/Nth of its previous value), the ongoing download of a segment (which was selected according to previous bandwidth before the drop) will take up to N×D to complete. In particular, if X % of the segment was downloaded when the network conditions changed, the remaining time to load the segment is equal to:

$$N \times D \times \frac{100 - X}{100}$$

The total download time for that segment is then equal to:

$$\frac{X \times D}{100} + N \times D \times \frac{100 - X}{100}$$

To avoid freezing the spherical video, the download of the considered segment has to be completed before that the playing time reaches the end of this segment (assuming that the playing time for each segment is constant and equal to D).

To overcome such downsides, it is well-known to use buffering, which allows to compensate for this download duration. For example, when the player has buffered two segments in advance and when the network bandwidth is suddenly halved, the player will play the two buffered segments of duration D while the next segment will be downloaded in a period equal to 2D. The player can then pursue without interruption by selecting a lower bit-rate for the next segment to load, with adaptive streaming. Then, more robustness to network variations is desired, bigger the size of the buffer needs to be.

However, when requested segments depend on the viewport position, buffered segments provide a quality for an area of the spherical video scene covered by the corresponding tile(s), chosen at the time of segment selection. There is then a delay between the decision of which area of the spherical video should be available and the moment the player will use it for display. In case of unpredicted and fast moves of the viewport during this delay, the player may need a spatial area of the spherical video scene that does not match the area provided by the buffered segment(s). Thus, during a time period roughly equal to the buffer length, the area of the scene displayed through the viewport will have a low-quality (the player uses the low-quality content instead of the buffered high-quality content), before being able to catch up with the high-quality. Indeed, if the viewport movements are more frequent than the time needed to load the correct segments in the buffer, the loss of quality (i.e. switching to the low-quality content) will occur frequently.

The present disclosure has been devised with the foregoing in mind.

SUMMARY

According to one or more embodiments, there is provided a client for managing a streaming session of a multimedia content stored on a network equipment and available at one or more representations, said multimedia content being temporally divided into a plurality of segments, said client comprising one or more processors configured for:
  determining one or more representations of a next segment to be requested for which a time for retrieving a first frame of the next segment to be requested is at most equal to a reference time;
  selecting, amongst the one or more determined representations, a representation complying with a quality criterium.

According to one or more embodiments, there is provided a method for managing, at a client, a streaming session of a multimedia content stored on a network equipment and available at one or more representations, said multimedia content being temporally divided into a plurality of segments, said method comprising:
  determining one or more representations of a next segment to be requested for which a time for retrieving a first frame of the next segment to be requested is at most equal to a reference time;
  selecting, amongst the one or more determined representations, a representation complying with a quality criterium.

According to one or more embodiments, there is provided a computer program product at least one of downloadable from a communication network and recorded on a non-transitory computer readable medium readable by at least one of computer and executable by a processor, comprising program code instructions for performing a method for managing, at a client, a streaming session of a multimedia content stored on a network equipment and available at one or more representations, said multimedia content being temporally divided into a plurality of segments, said method comprising:
  determining one or more representations of a next segment to be requested for which a time for retrieving a first frame of the next segment to be requested is at most equal to a reference time;
  selecting, amongst the one or more determined representations, a representation complying with a quality criterium.

According to one or more embodiments, there is provided a non-transitory program storage device, readable by a computer, tangibly embodying a program of instructions executable by the computer to perform a method for managing, at a client, a streaming session of a multimedia content stored on a network equipment and available at one or more representations, said multimedia content being temporally divided into a plurality of segments, said method comprising:
  determining one or more representations of a next segment to be requested for which a time for retrieving a first frame of the next segment to be requested is at most equal to a reference time;
  selecting, amongst the one or more determined representations, a representation complying with a quality criterium.

The methods according to the one or more embodiments may be implemented in software on a programmable apparatus. They may be implemented solely in hardware or in software, or in a combination thereof.

Some processes implemented by elements of the one or more embodiments may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as "circuit", "module" or "system". Furthermore, such elements may take the form of a computer program product embodied in any tangible medium of expression having computer usable program code embodied in the medium.

Since elements can be implemented in software, some aspects of the embodiments can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like.

The one or more embodiments thus provide a computer-readable program comprising computer-executable instructions to enable a computer to perform above mentioned methods.

Certain aspects commensurate in scope with the disclosed embodiments are set forth below. It should be understood that these aspects are presented merely to provide the reader with a brief summary of certain forms the one or more embodiments might take and that these aspects are not intended to limit the scope of the disclosure. Indeed, the disclosure may encompass a variety of aspects that may not be set forth below.

BRIEF DESCRIPTION OF THE DRAWINGS

The disclosure will be better understood and illustrated by means of the following embodiment and execution examples, in no way limitative, with reference to the appended figures on which.

Wherever possible, the same reference numerals will be used throughout the figures to refer to the same or like parts.

DETAILED DESCRIPTION

Figure 1:
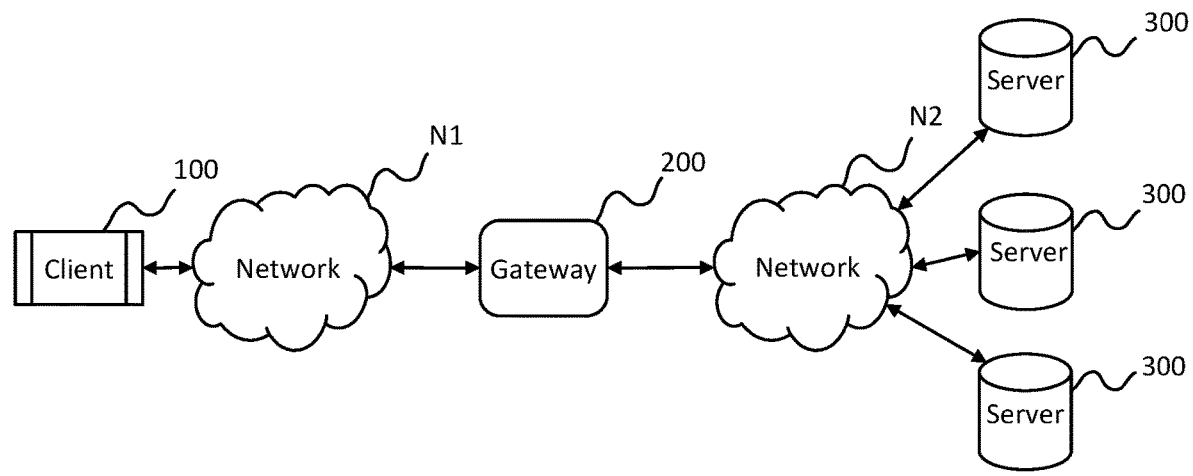
FIG. 1 is a schematic diagram of an exemplary Client-Server network architecture wherein some embodiments might be implemented.

The following description illustrates some embodiments. It will thus be appreciated that those skilled in the art will be able to devise various arrangements that, although not explicitly described or shown herein, embody some aspects of the embodiments and are included within their scope.

All examples and conditional language recited herein are intended for educational purposes to aid the reader in understanding the embodiments and are to be construed as being without limitation to such specifically recited examples and conditions.

Moreover, all statements herein reciting embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying some aspects of the embodiments. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

In the claims hereof, any element expressed as a means and/or module for performing a specified function is intended to encompass any way of performing that function including, for example, a) a combination of circuit elements that performs that function or b) software in any form, including, therefore, firmware, microcode or the like, combined with appropriate circuitry for executing that software to perform the function. It is thus regarded that any means that can provide those functionalities are equivalent to those shown herein.

In addition, it is to be understood that the figures and descriptions of the present disclosure have been simplified to illustrate elements that are relevant for a clear understanding of the present embodiments, while eliminating, for purposes of clarity, many other elements found in typical digital multimedia content delivery methods, devices and systems. However, because such elements are well known in the art, a detailed discussion of such elements is not provided herein. Embodiments herein are directed to all such variations and modifications known to those skilled in the art.

Embodiments are depicted with regard to an adaptive streaming environment to deliver a multimedia content (such as an immersive video) to a client through a delivery network.

As shown in the exemplary embodiment of FIG. 1, a Client-Server network architecture, including a first network N1 (e.g. a home network, an enterprise network) and a second network N2 (e.g. a broadband network such as the Internet), comprises a client 100 in communication with a gateway 200 and network equipment 300 such as content servers (in FIG. 1, three servers are represented). The first network N1 is for instance connected to the second network N2 through the gateway 200.

The client 100—which is for instance a streaming client device connected to the gateway 200 through the network N1—wishes to connect to a server 300 (e.g. an HTTP server) through the broadband network N2 in order to launch a streaming session for retrieving a multimedia content from the Internet N2. Once the connection is established with the client device 100, the server 300 streams segments to the client device 100, upon requests, using a streaming protocol over, for instance, one or more TCP/IP connections. In the following, as an illustrative but non-limitative example, adaptive streaming (such as the HTTP adaptive streaming protocol, so called HAS, like MPEG-DASH or HLS) is considered to deliver an immersive video (such as a spherical video) to the client device 100 from the server 300. Naturally, it should be understood that the present disclosure is not limited to immersive video such as a spherical video but could also apply to any other multimedia content (e.g. panoramic videos, 3DoF videos, 3DoF+ videos, 6DoF videos, audio content, etc.) providing during an adaptive streaming session.

Figure 2:
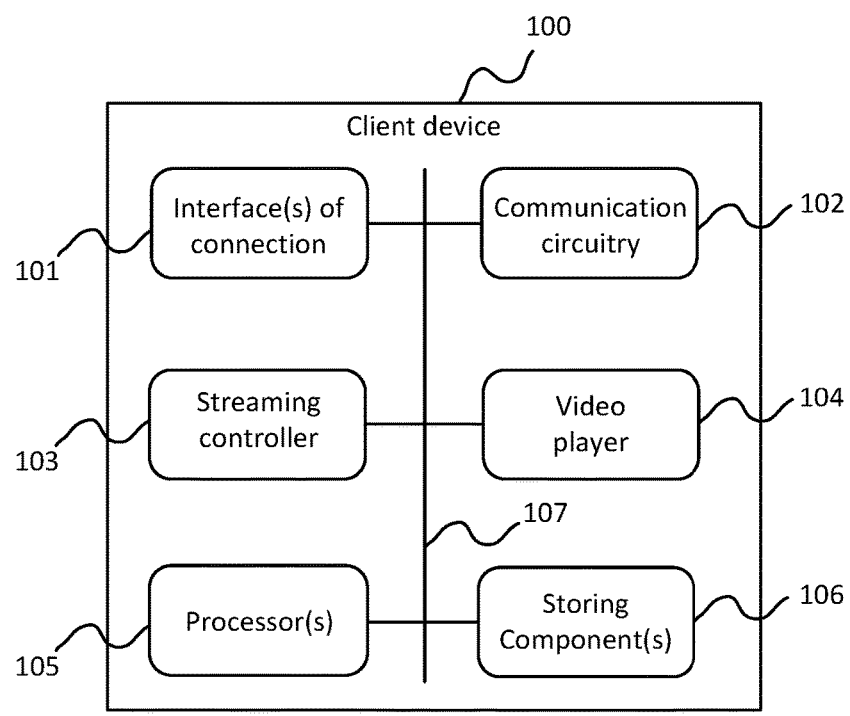
FIG. 2 is a schematic block diagram of an exemplary client wherein some embodiments might be implemented.

As shown in the example of FIG. 2, a client device 100 of the first network N1 can comprise at least:
  interface(s) for connection 101 (wired and/or wireless, as for example Wi-Fi, Ethernet, etc.) to the network N1 or to a further network (not shown);
  communication circuitry 102 implementing the protocol stacks for communication with one or more servers 300. In particular, the communication circuitry 102 comprises the TCP/IP stack. Of course, it could be any other type of network and/or communicating means enabling a client device 100 to communicate with a server 300;

a streaming controller 103 which receives, along a streaming session, a multimedia content from one or more servers 300 (especially the corresponding segments). In particular, in case of adaptive streaming, the streaming controller 103 can for instance continually select segments at the bit rate that better matches the network constraints and its own constraints;

a video player 104 adapted to decode and render the multimedia content received through the streaming session. It should be understood that the streaming controller 103 and the video player 104 can be combined, in a variant, to form a single entity;

one or more processor(s) 105 for executing the applications and programs stored in a memory of the client device 100;

storing component(s) 106 (e.g. volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code. In particular, a volatile memory can for instance buffer segments received from a server 300 before their transmission to the video player 104;

an internal bus 107 (hardware and/or software implementation) to connect the various modules and all means well known to the skilled in the art for performing the generic client device functionalities.

As an example, the client device 100 is a portable media device, a mobile phone, a tablet or a laptop, a head mounted device, a TV set, a set-top box or the like. Naturally, the client device 100 might not comprise a complete video player, but only some sub-elements such as the ones for demultiplexing and decoding the media content and might rely upon an external means to display the decoded content to the end user.

Figure 3:
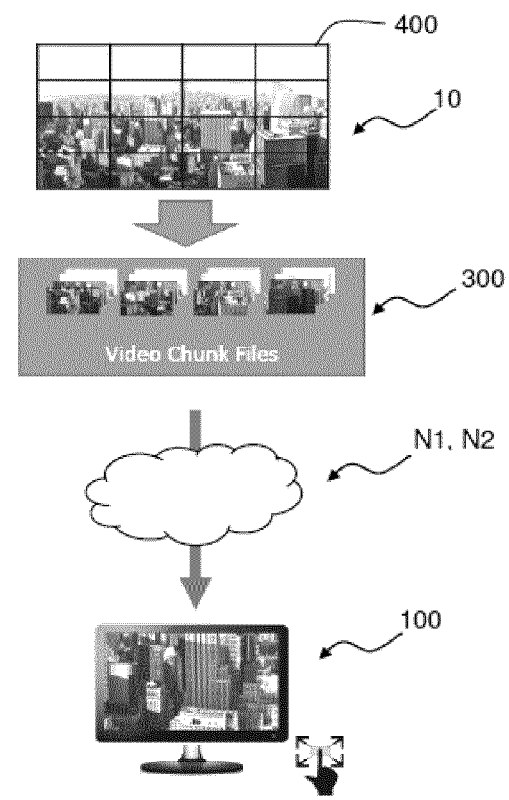
FIG. 3 is an exemplary delivery system wherein some embodiments might be implemented.
Figure 4:
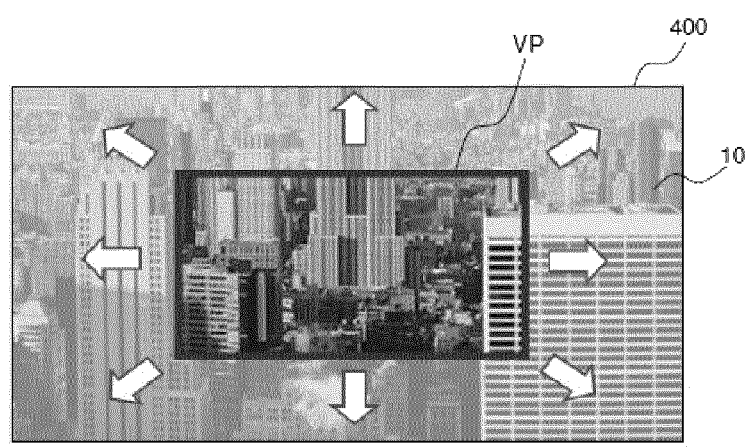
FIG. 4 shows an exemplary tile comprising a viewport in accordance with one or more embodiments.
Figure 5:
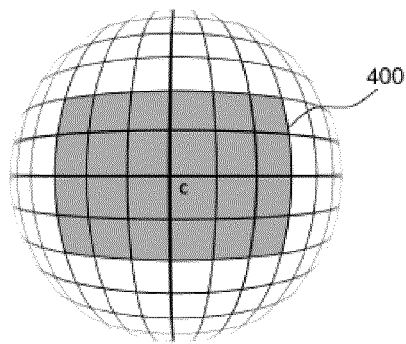
FIGS. 5 and 6 show an exemplary tile of set of tiles covering an immersive video compliant with one or more embodiments.
Figure 6:
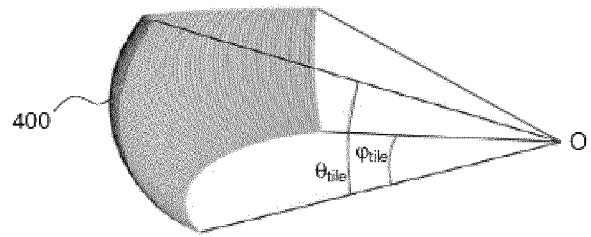

According to one embodiment, the client device 100 (e.g. via its player 104) can manage two parallel adaptive streaming sessions:

one high-quality streaming session for providing a portion of the scene of the immersive video intended to cover an area of the scene displayed through the viewport VP in high-quality. The high-quality decoder (not shown in the Figures) of the video player 104 can be in charge of processing the high-quality streaming session; and one low-quality streaming session for providing a fallback low-quality content when the viewport position does not match the portion of the scene available in high-quality. It is assumed that the low-quality streaming session provides the whole scene (spherical scene or panoramic scene) of the immersive video and is delivered in time to the player 104 whatever the quality, when possible. The low-quality decoder (not shown) of the player 104 can operate the low-quality streaming session;

The high-quality streaming session can be a tile-based video service, as depicted in FIG. 3. In a tile-based video service, the immersive video (in the shown example of FIG. 3, a panoramic video) is spatially sliced into a set of tiles at the server side. The set of tiles covers the whole scene of the immersive video. The size of the tiles can be defined large enough to allow a variation of the focusing point without being forced to obtain and decode instantaneously another tile. In particular, in the following, it is assumed that one tile delivered to the device 100 can cover at least the part of scene (a spherical scene or a panoramic scene) to be displayed through the viewport VP associated with the client device 100 requesting the immersive video (as shown in the example of FIG. 4 compliant with the present principles), so that one tile segment is needed. Naturally, in a variant, when tiles are smaller than the viewport VP, several tiles might be needed to obtain the part of the scene displayed through the viewport VP, so that several tile segments have to be concurrently requested and downloaded to be merged before display.

In addition, the immersive video can be already formatted for adaptive streaming. In that case, the immersive video is temporally divided into a plurality of video segments of equal duration, each video segment being available at different video qualities (also called representations) at the server 300.

For all the available video qualities, each video segment of the immersive video is spatially split in tiles 400 (each tile covering a portion of the scene (spherical scene or panoramic scene) as illustrated in FIGS. 3 to 6) according to the same tile arrangement. Each video segment is then defined by a set of tile segments of the same duration to cover the whole scene (each tile segment being available at said different video qualities). Every tile segment—comprising a plurality of coded video frames—is of equivalent duration. Each video frame of a video segment is obtained from the video frames of the corresponding tile segments defining said video segment.

In the following, for conciseness reason, a segment refers to either a video segment, or a tile segment or one or more tile segments of a same current video segment.

While not mandatory, it is further assumed that an overlap exists between consecutive tiles 400 of the set of tiles. Naturally, while a tile of rectangular shape has been illustrated in FIGS. 4, the present principles can be applied to any other type of tile shape such as the one shown in FIGS. 5 and 6.

In an embodiment, a segment duration D can be chosen as small as possible to minimize the switching delays while keeping a reasonable compression quality. The limitation to shortening the duration D comes from the need to make segments independently decodable. To that end, they need to start with a Random Access Point, such as an IDR (Instantaneous Decoder Refresh) frame (e.g. an I frame). These frames are less efficiently encoded than motion predictive pictures (such as P-frames or B-frames), and their frequency in the video stream impact the overall bit-rate significantly.

For decoding of a segment, at least its first frame (i.e. the IDR) is needed. Encoding schemes usually comprise bi-predictive frames (so called B frames which are Bi-directionally predicted frames, coded based on both previous and future coded frames) inserted between one-predictive frames (so called P-frames which are Predictively coded frames, coded based on previously coded frame).

For instance, IBBPBBPBBPBBPBP (display order) is an encoding scheme where B frames may use the previous I or P frame and the next P frame for prediction and P frames use the previous I or P frame. In this example, the player 104 needs to acquire the first I frame (Intra-coded frame, coded independently of all other frames) with the first P frame, before being able to decode the first B frame. Since the P and B frames are much smaller than the I frame, the data size to be downloaded before starting the decoding can roughly correspond to half of the volume of the segment data for that GOP structure. The frame duration (i.e. the display time of a frame) is the same for every frame of a GOP.

Figure 7:
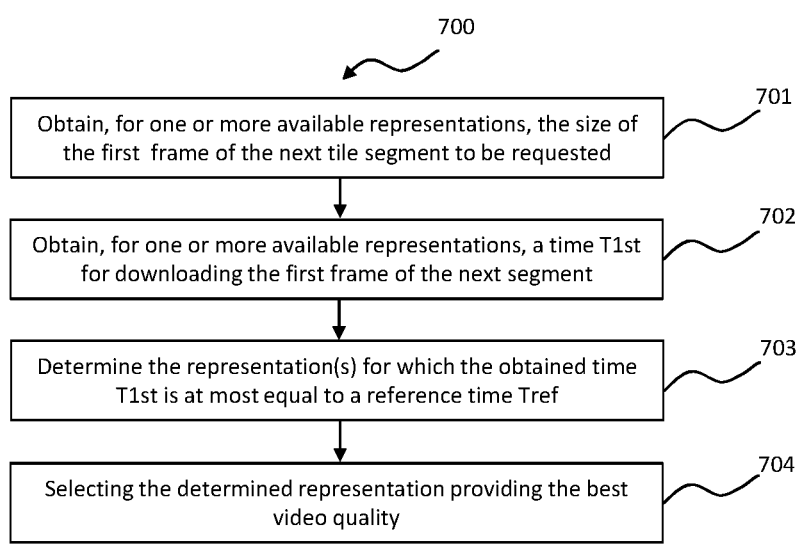
FIG. 7 is a flow chart of an exemplary method for managing streaming of tile based immersive video, according to some embodiments.

As shown in FIG. 7, the client 100 is configured to implement (e.g. via its streaming controller 103, its player 104 and/or processor(s) 105) the method 700 for managing an adaptive streaming session of a high-quality stream of a multimedia content such as an immersive video.

Figure 8:
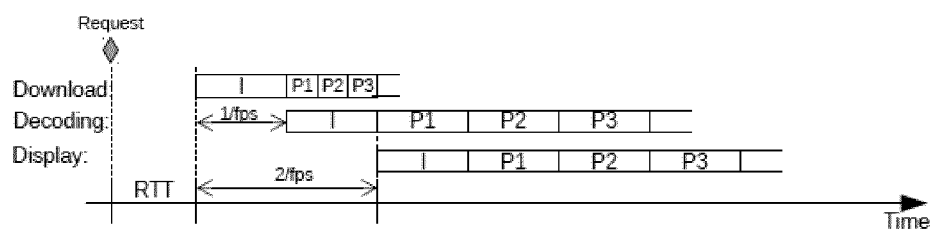
FIGS. 8 and 9 are exemplary time diagrams showing the managing of segment requests within an adaptive streaming session using zero buffering according to some embodiments, wherein the group of pictures forming the segment comprises only I and P frames having the different sizes (FIG. 8) or the same size (FIG. 9)
Figure 9:
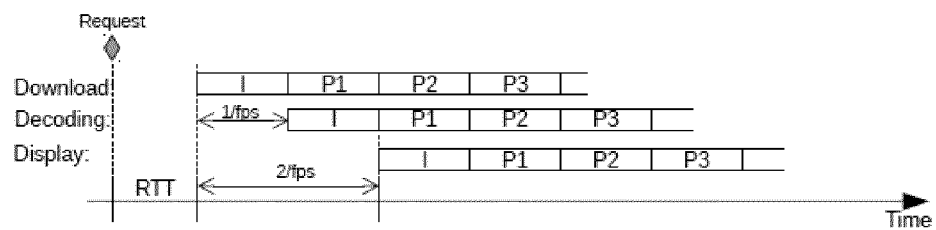

In the following, it is assumed that the decoding of a segment can start when its first frame has been downloaded by considering the exemplary but non limitative encoding scheme IPPPPPPPPPPPPPPP (as shown in the examples of FIGS. 8 and 9) using only references that occur sooner in the display order, then the last decoded frame has no reference frame displayed after it. Naturally, the present principles can also be implemented with any other encoding schemes (but in the worst case, the entire segment needs to be received before being able to display the second frame). When expecting stable network conditions, the client can choose a representation for which the downloading of half of a segment takes a duration D/2.

In a step 701, the client device 100 obtains, for available representations, the size Sist of the first frame of a next tile segment to be requested of the immersive video.

In particular, in an embodiment, while receiving the segments, the size $S_{1st}$ of the first frame can be extracted continuously from each of them. This information may be provided to the client device 100 for instance:
- when using the ISO-BMFF format, by parsing the moof box in order to retrieve the location and size of each picture data within the stream, or
- by the video player 104 while decoding each frame for rendering, or
- by any other suitable way known to the skilled in the art, depending on the format used to encapsulate the video stream.

For any given representation, to compute the size $S_{1st}$ of the first frame of the next segment to be requested, the client device 100 can for instance use:
an arithmetic mean defined by:

$$S_{1st} = 1/n * \sum_{i=1}^{n} (S_{1st,i})$$

wherein the obtained average is smoothed and a sudden change is not reflected;
a moving average defined by:

$$S_{1st,i} = 1/N * \sum_{k=0}^{N-1} (S_{1st,i-1-k})$$

wherein the obtained average is also smoothed and a sudden change is not reflected but the oldest values are discarded (N being the size of the sliding window);
a weighted moving average defined by:

$$S_{1st,i} = 1/\sum_{j=1}^{N} (j) * \sum_{k=0}^{N-1} ((N-k) * S_{1st,i-1-k})$$

wherein the obtained average is smoothed but the recent samples have more importance than the oldest ones, so that upcoming changes are reflected faster;
an exponential moving average defined by:

$$S_{1st,i} = \alpha * S_{1st,i-1} + (1-\alpha) * S_{1st,i-2} \text{ with } 0<\alpha<1$$

wherein the obtained average is smoothed and the recent samples have more importance than the oldest ones. In addition, the weight of old samples decreases rapidly (i.e. a higher α faster discounts older samples).

It should further be noted that, for a given representation R for which no segment has already been requested, the size of the $1^{st}$ frame can be initialized to half of the segment size which may be first approximated with:

$$S_{1st,init} = \frac{1}{2} * D * BR_R$$

wherein:
D is the segment duration;
$BR_R$ is the throughput (or bit-rate) associated with the representation R.

In a variant, it may be expected that different representations are produced with a similar encoding scheme. The initial estimation for a new representation R', knowing at least the frame size estimation for another representation R, can be obtained as follows:

$$S_{1st,init,R'} = S_{1st,R} * \frac{BR_{R'}}{BR_R}$$

wherein:
$BR_R$ is the throughput associated with the representation R;
$BR_{R'}$ is the throughput associated with the representation R'.

In another embodiment, when the adaptive streaming session is implemented according to MPEG-DASH standard, the size of the $1^{st}$ frame for a given segment of every available representation may be provided by either by a server 300 or by a network element DANE to the client device via a manifest (so called MPD, Media Presentation Description) or a SAND message compliant with MPEG-DASH standard.

When using a manifest MPD to provide the size of the $1^{st}$ frames, the signaling embedded within the manifest about each available representation comprises:
a bandwidth indicating that, if the client experiences at least this throughput, it shall be able to receive and decode correctly the stream, subject to a minimum buffer size. This information does not enable the client to determine the time needed to load the I frames;
an additional information provided by the server, such as a parameter maxFrameSize, which is defined for any representation. Such additional information can be embedded within the MPD (e.g. as an additional attribute of the XML element Representation). This information from the server guarantees that, for a considered representation, any video frame has a size at most equal to this value of maxFrameSize.

In the variant, a SAND message may deliver the size of the $1^{st}$ frames to a DASH client device, instead of the MPD. This can be used in case the encoder produces frame ratios that vary in time. Signaling through messages is less costly in this case than making frequent updates for the entire MPD. Such messages supersede the values provided in the MPD, if any. Delivery of such messages from the server or other element in the network aware of the video structure is possible in DASH as described in part 5 SAND ("Server And Network assisted Delivery"). It is obviously an additional message to the existing list. This message would enter the category PER (Parameters Enhancing Reception). Apart from standard message properties (source, validity time . . . ), the SAND message conveys:

a reference to the URL in the MPD which identifies the content itself;

a list of couples of values (representation Id; maxFrame-Size). The representation Id corresponds to the identifier provided in the MPD as an existing attribute of the Representation element.

Once the size $S_{1st}$ of the $1^{st}$ frame is obtained, the client device computes (at step 702), for the available representations, an estimation of the time $T_{1st}$ for retrieving (i.e. downloading) the first frame of the next segment to be requested, for instance from the following formula:

$$T_{1st}=S_{1st}/BW$$

wherein:

$S_{1st}$ corresponds to the size of the first frame of the next segment to be requested, ($S_{1st}$ depending on the representation);

BW represents the available bandwidth of the network estimated by the client device 100.

In a step 703, the client device 100 determines, amongst the available representations, one or more representations for which the associated time $T_{1st}$ for retrieving the first frame (e.g. I frame) of the next tile segment to be requested is at most equal to a reference time $T_{ref}$ (i.e. $T_{1st} \leq T_{ref}$) defined by:

$$T_{ref}=RTT+1/fps$$

wherein:

RTT is defined as a Round Trip Time between a sending of a request for obtaining the first image and a reception by the device of a first data packet of the first image;

fps is a number of frames per second.

When using a manifest to provide the size of the $1^{st}$ frames, the client device 100 is then able to compute, from the received manifest, the largest duration of downloading (max_duration) for any video frame in any segment in this representation from the following formula:

$$\text{max\_duration} = \frac{maxFrameSize}{available\_bandwidth}$$

When the largest duration of downloading (max_duration) for a given representation is at most to 1/fps (i.e. max_duration≤1/fps), such a representation can be used with zero buffering.

More precisely, starting from the time at which a request (e.g. an HTTP request) for a next tile segment is sent by the client device 100, the delay after which the beginning portion of the tile segment containing the first frame is fully received (i.e. all the packets forming the first frame are received) is bounded by the reference time $T_{ref}$.

When $T_{S1st} \leq T_{ref}$ for a considered representation, such a representation can be used with zero buffering and can be requested. By contrast, when $T_{S1st} > T_{ref}$ for a given representation, this representation cannot be used with zero buffering for the next tile segment.

Among all the representations compatible with zero buffering, the client device 100 will choose, in a step 704, to request the representation having the best quality to enhance user experience, for instance by selecting the representation having its associated bit-rate higher than the bit-rates of the other determined representations, In a variant, a representation is selected, in the step 704, when its associated quality indicator (provided for instance by a manifest MPD through the attribute @qualityRanking) is lower than the quality indicators of the other determined representations (a quality indicator being inversely proportional to the quality). In particular, @qualityRanking specifies a quality ranking of a representation relative to other representations in a same Adaptation Set (lower values representing higher quality content). If no quality indicator is present, then no ranking is defined.

In an embodiment, the client device 100 is able to manage an immersive video in such a way that buffering can be reduced as much as desired down to zero (i.e. each received video frame can be transmitted for decoding immediately and displayed in due time), so called zero buffering.

It should be understood that, when the available network bandwidth is low so that no representation of the next segment to be requested allows to download the $1^{st}$ frame (e.g. I frame) in the 1/fps delay, the client device 100 may choose to make a compromise by allowing a small buffering (e.g. 2 frames) which can be obtained by selecting a representation where the time to download the first frame will be at most equal to the playing/display duration of the number of buffered images. If N images are buffered, the download duration of the first frame should be no longer than N/fps. The small penalty in switching delay allows to get a better picture quality.

Thanks to one or more of the described embodiments, the latency can be reduced since the time to send a request for the next segment to be downloaded can be reduced to a minimum of one frame duration plus one RTT. The selection of the tile and the representation can be done very late, providing a closer match to the actual viewing parameters.

Instead of choosing the best available representation that can be streamed in average within the estimated bandwidth, the client device may choose the representation for which the biggest frames (Intra coded frames) can be downloaded in one frame duration (1/fps).

In addition, as shown in FIG. 9, the frames can be encoded in such a way that they have the same size regardless the type of frame (i.e. I or P frame). The frame I is then of lower quality compared to the P frames, but the whole amount of data of the segment is such that the loading of the whole segment is completed at least in the segment duration D. The overall quality of the example of FIG. 9 is better than in the case of FIG. 8 wherein the selected representation would be much smaller, resulting in a reduced quality.

Figure 10:
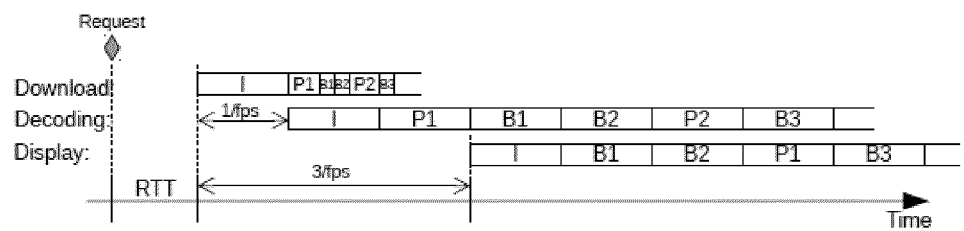
FIG. 10 is an exemplary time diagram showing the managing of segment requests within an adaptive streaming session buffering according to an embodiment, wherein the group of pictures forming the segment comprises I, P, B frames having different sizes.

Besides, the coding structure of Groups Of Pictures (GOP) of a tile segment may introduce a need for additional buffering when the transmission order of coded pictures differ from their display order (which is for instance the case with bi-predictive frames B using both one previous frame and one next frame as shown in FIG. 10). The reference frame must be decoded prior to the B frame and are thus transmitted before the dependent pictures.

In such a case, while a zero buffering before decoding a received $1^{st}$ frame can be implemented, one frame needs to be buffered at the decoder output to manage the reordering before display. This corresponds to an additional delay equal to 1/fps, so that the total delay between requesting a segment and being able to display it without interruption is RTT+3/fps, whereas such a delay is equal to RTT+2/fps when the video coding scheme only uses forward predictions (typically only I and P frames).

In an illustrative but not limitative example, the method 700 can be implemented for the transmission of a live event, wherein the buffering needs to be minimized. In that case, the buffering is not limited by a user action impacting the video tile to be retrieved but by the necessity to reduce time between the video capture and the rendering.

More generally, in an embodiment, a client for managing a streaming session of a multimedia content stored on a network equipment and available at one or more representations, said multimedia content being temporally divided into a plurality of segments, comprises one or more processors configure for:
  determining one or more representations of a next segment to be requested for which a time for retrieving a first frame of the next tile segment to be requested is at most equal to a reference time;
  selecting, amongst the one or more determined representations, a representation complying with a quality criterium.

In an embodiment, a method for managing, at a client, a streaming session of a multimedia content stored on a network equipment and available at one or more representations, said multimedia content being temporally divided into a plurality of segments, comprises:
  determining one or more representations of a next segment to be requested for which a time for retrieving a first frame of the next segment to be requested is at most equal to a reference time;
  selecting, amongst the one or more determined representations, a representation complying with a quality criterium.

In an embodiment, the reference time is defined by:

$$T_{ref} = RTT + 1/fps$$

wherein:
  RTT is defined as a Round Trip Time between a sending of a request for obtaining the first image and a reception by the client of a first data packet of the first image;
  fps is a number of frames per second.

In an embodiment, a representation complies with the quality criterium when its associated bit-rate is higher than the bit-rates associated with the other determined representations.

In an embodiment, the time for retrieving the first frame of the next segment to be requested is obtained from the following ratio:

$$T_{1st} = S_{1st}/BW$$

wherein:
  $S_{1st}$ corresponds to a size of the first frame of the next segment to be requested;
  BW represents an available bandwidth.

In an embodiment, the size of the first frame of the next segment to be requested is obtained from one or more segments previously received.

In an embodiment, the size of the first frame of the next segment to be requested is obtained from a manifest file.

In an embodiment, the size of the first frame of the next segment to be requested is obtained from a message delivered by a network equipment.

In an embodiment, all the frames of a group of pictures defining a segment have the same size.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the method and device described. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

Although certain embodiments only of the disclosure have been described herein, it will be understood by any person skilled in the art that other modifications, variations, and possibilities of the disclosure are possible. Such modifications, variations and possibilities are therefore to be considered as falling within the spirit and scope of the disclosure and hence forming part of the disclosure as herein described and/or exemplified.

The flowchart and/or block diagrams in the Figures illustrate the configuration, operation and functionality of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

Besides, it is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

The invention claimed is:

1. A client device for managing a streaming session of a multimedia content received from a communication network, said client device comprising one or more processors configured for:
  obtaining, for representations of the multimedia content having multiple segments, a frame size of a first frame of a next segment to be requested;

obtaining, for the representations of the multimedia content, a download time for the first frame of the next segment to be requested from a ratio of the obtained frame size of the first frame of the next segment to be requested over an available bandwidth; and requesting a representation from among the representations based on the obtained download time of the representation being equal to or below a reference time.

2. The client device of claim 1, wherein the reference time is defined by:

$$T_{ref}=RTT+1/fps$$

wherein:
RTT is defined as a Round Trip Time between a sending of a request for obtaining the first frame and a reception by the client device of a first data packet of the first frame; and
fps is a number of frames per second.

3. The client device of claim 1, wherein a bit-rate associated with the requested representation is higher than bit-rates associated with other representations.

4. The client device of claim 1, wherein the frame size of the first frame of the next segment to be requested is obtained from one or more segments previously received.

5. The client device of claim 1, wherein the frame size of the first frame of the next segment to be requested is obtained from a manifest file.

6. The client device of claim 1, wherein the frame size of the first frame of the next segment to be requested is obtained from a message received from the communication network.

7. The client device of claim 1, wherein all the frames of a group of pictures defining a segment have the same frame size.

8. A computer program product, at least one of downloadable from a communication network or recorded on a non-transitory computer readable medium, readable by at least one computer and executable by a processor, comprising program code instructions for performing a method to be implemented at a client device for managing a streaming session of a multimedia content received from a communication network, said method comprising:

obtaining, for representations of the multimedia content having multiple segments, a frame size of a first frame of a next segment to be requested;

obtaining, for the representations of the multimedia content, a download time for the first frame of the next segment to be requested from a ratio of the obtained frame size of the first frame of the next segment to be requested over an available bandwidth; and requesting a representation from among the representations based on the obtained download time of the representation being equal to or below a reference time.

9. A non-transitory computer readable medium storing program instructions that, when executed by one or more processors, perform a method to be implemented at a client device for managing a streaming session of a multimedia content received from a communication network, said method comprising:

obtaining, for representations of the multimedia content having multiple segments, a frame size of a first frame of a next segment to be requested;

obtaining, for the representations of the multimedia content, a download time for the first frame of the next segment to be requested from a ratio of the obtained frame size of the first frame of the next segment to be requested over an available bandwidth; and requesting a representation from among the representations based on the obtained download time of the representation being equal to or below a reference time.

10. A method for managing, at a client device, a streaming session of a multimedia content received from a communication network, said method comprising:

obtaining, for representations of the multimedia content having multiple segments, a frame size of a first frame of a next segment to be requested;

obtaining, for the representations of the multimedia content, a download time for the first frame of the next segment to be requested from a ratio of the obtained frame size of the first frame of the next segment to be requested over an available bandwidth; and requesting a representation from among the representations based on the obtained download time of the representation being equal to or below a reference time.

11. The method of claim 10, wherein the reference time is defined by:

$$T_{ref}=RTT+1/fps$$

wherein:
RTT is defined as a Round Trip Time between a sending of a request for obtaining the first frame and a reception by the client device of a first data packet of the first frame; and
fps is a number of frames per second.

12. The method of claim 10, wherein a bit-rate associated with the requested representation is higher than bit-rates associated with other representations.

13. The method of claim 10, wherein the frame size of the first frame of the next segment to be requested is obtained from one or more segments previously received.

14. The method of claim 10, wherein the frame size of the first frame of the next segment to be requested is obtained from a manifest file.

15. The method of claim 10, wherein the frame size of the first frame of the next segment to be requested is obtained from a message received from the communication network.

16. The method of claim 10, wherein all the frames of a group of pictures defining a segment have the same frame size.

* * * * *